(12) United States Patent
Zhang et al.

(10) Patent No.: US 10,112,874 B2
(45) Date of Patent: Oct. 30, 2018

(54) METHOD FOR COATING METAL NANOPARTICLES ON OXIDE CERAMIC POWDER SURFACE

(71) Applicant: Hohai University, Nanjing, Jiangsu (CN)

(72) Inventors: Jianfeng Zhang, Jiangsu (CN); Yuping Wu, Jiangsu (CN); Sheng Hong, Jiangsu (CN); Gaiye Li, Jiangsu (CN); Wenmin Guo, Jiangsu (CN)

(73) Assignee: Hohai University, Nanjing, Jiangsu (CN)

( * ) Notice: Subject to any disclaimer, the term of this patent is extended or adjusted under 35 U.S.C. 154(b) by 19 days.

(21) Appl. No.: 15/328,094

(22) PCT Filed: Jun. 30, 2015

(86) PCT No.: PCT/CN2015/082892
§ 371 (c)(1),
(2) Date: Jan. 23, 2017

(87) PCT Pub. No.: WO2016/023405
PCT Pub. Date: Feb. 18, 2016

(65) Prior Publication Data
US 2017/0217840 A1    Aug. 3, 2017

(30) Foreign Application Priority Data
Aug. 11, 2014    (CN) .......................... 2014 1 0392587

(51) Int. Cl.
*C04B 35/628* (2006.01)
*C04B 35/053* (2006.01)
(Continued)

(52) U.S. Cl.
CPC ........ *C04B 35/62842* (2013.01); *C04B 35/04* (2013.01); *C04B 35/053* (2013.01);
(Continued)

(58) Field of Classification Search
CPC ......... C04B 35/04; C04B 35/10; C04B 35/14; C04B 35/46; C04B 35/48; C04B 35/6261; C04B 35/62842
(Continued)

(56) References Cited

U.S. PATENT DOCUMENTS

2011/0293940  A1*  12/2011  Tokoro ..................... B22F 1/02
                                                                 428/404

FOREIGN PATENT DOCUMENTS

CN          1386722          12/2002
CN          101259532          9/2008
(Continued)

OTHER PUBLICATIONS

International Search Report and Written Opinion of PCT/CN2015/082892 dated Aug. 5, 2015, 10 pages (English and Chinese).

*Primary Examiner* — Alexander M Weddle
(74) *Attorney, Agent, or Firm* — Rankin, Hill & Clark LLP

(57) ABSTRACT

The present invention discloses a method for uniformly coating metal nanoparticles without a carbon impurity on an oxide ceramic powder surface, which includes the steps of putting grinded and mixed a metal organic material and oxide ceramic powder into a rotational reaction chamber, then bubbling oxidizing gas under a rotational and heating condition to oxidize the metal organic material into a metal oxide, and finally bubbling reducing gas to reduce the metal oxide into nanoparticles in a metallic state, so as to implement the uniform coating of the nanoparticles in the metallic state, and avoid coarsening and growing problems of nanoparticles led by a long-term coating reaction under a high temperature. The present invention has a simple method and a short preparation period, and the metal nanoparticles prepared are uniformly dispersed and have wide application (Continued)

prospects in multiple fields like catalytic materials and conductive ceramics.

9 Claims, 2 Drawing Sheets

(51) Int. Cl.
    *C04B 35/111*     (2006.01)
    *C04B 35/14*     (2006.01)
    *C04B 35/46*     (2006.01)
    *C04B 35/486*     (2006.01)
    *C04B 35/626*     (2006.01)
    *C04B 35/04*     (2006.01)
    *C04B 35/10*     (2006.01)
    *C04B 35/48*     (2006.01)

(52) U.S. Cl.
    CPC ............ *C04B 35/10* (2013.01); *C04B 35/111* (2013.01); *C04B 35/14* (2013.01); *C04B 35/46* (2013.01); *C04B 35/48* (2013.01); *C04B 35/486* (2013.01); *C04B 35/6261* (2013.01); *C04B 35/6265* (2013.01); *C04B 35/62615* (2013.01); *C04B 2235/405* (2013.01); *C04B 2235/407* (2013.01); *C04B 2235/44* (2013.01); *C04B 2235/652* (2013.01); *C04B 2235/658* (2013.01); *C04B 2235/6582* (2013.01); *C04B 2235/6583* (2013.01); *C04B 2235/781* (2013.01); *C04B 2235/786* (2013.01)

(58) Field of Classification Search
    USPC ........................................ 427/212, 213, 219
    See application file for complete search history.

(56) References Cited

FOREIGN PATENT DOCUMENTS

| | | |
|---|---|---|
| CN | 101314545 | 12/2008 |
| CN | 101439973 | 5/2009 |
| CN | 104150912 | 11/2014 |

* cited by examiner

METHOD FOR COATING METAL NANOPARTICLES ON OXIDE CERAMIC POWDER SURFACE

TECHNICAL FIELD

The present invention particularly relates to a method for coating metal nanoparticles on an oxide ceramic powder surface, and belongs to the field of material processing engineering.

BACKGROUND

Coating a layer of one or more types of heterogeneous metal nanoparticles on a ceramic powder surface, especially on an oxide powder surface of aluminium oxide ($Al_2O_3$), zirconium oxide ($ZrO_2$), silox ($SiO_2$) and ferroferric oxide ($Fe_3O_4$) may make the ceramic powder possess the performances of a metal coating shell and a ceramic core at the same time, reduce a conglobation effect of the powder and segregation between each phase (especially metal and ceramics), give new performances to the oxide powder, such as a catalytic performance, an electromagnetic performance, or the like, or surface performances that effectively change the powder, such as an electrochemical performance and a diffusibility during sintering. Therefore, great attention is paid to the development of a coating technology and applications thereof in more fields including structure and function ceramics.

At present, preparation methods of metal-coated ceramic powder mainly include a mechanical mixing method, a sol-gel method, a chemical plating method, a chemical vapor deposition method, etc. Wherein, the mechanical mixing method is simplest, but it is difficult to uniformly mix powder with a larger difference on density property. The sol-gel method is a method to disperse materials in a solvate to form sol and gel through hydrolysis, and obtain a nanoparticle material required through drying and thermal treatment. Ni—$Al_2O_3$ powder had been obtained by Rodeghiero, et al, using the sol-gel method. Powder processed by sol and gel was subjected to thermal treatment in H2 gas environment for 1 h to reduce Ni salt into Ni, and then the powder was subjected to hot pressed sintering under a temperature condition ranging from 1350 to 1400° C. for 2-4 h, to obtain a dense $Al_2O_3$—Ni composite material (Materials Science and Engineering A, 1995, 195, pp 151-161). Compared with a solid phase reaction, the chemical reaction in the sol-gel method is easier to be conducted, and the composition temperature is lower, but the temperature of subsequent heating processing is usually higher (calcination, crystallization, and reduction to obtain metallic phase), which is easy to cause conglobation of the powder and slight sintering of the metallic phase.

The chemical plating is a widely applied method which coats powder through an electrochemical process without an extra electric field, and has the advantages of simple equipment, designable clad layer performance. Cao Xiaoguo, et al, used the chemical plating method to coat silver on a $Fe_3O_4$ powder surface in a water/ethanol medium using formaldehyde as a reductive agent. The test result showed that the silver layer uniformly and completely coated on the $Fe_3O_4$ powder surface effectively improved a powder agent electroconductibility of the $Fe_3O_4$ powder. (Material Engineering, 2007, 4, pp 57-60). $Al_2O_3$ powder coated by Ni was obtained by Mehmet Uysal, et al, using an electroplating process. $Al_2O_3$ powder was preprocessed in a $SnCl_2$ solution firstly to improve a surface activity of the $Al_2O_3$ powder, and then uniformly distributed Ni nanoparticles were coated on the $Al_2O_3$ powder surface through controlling the pH value, $NiCl_2$ concentration, and other technological parameters of the solution using $NiCl_2$ as a Ni source (Ceramics International, 2013, 39, pp 5485-5493). However, the powder chemical plating has a certain particularity. The powder surface needs to have a good catalytic activity to implement uniform deposition of a modified layer on the surface, and necessary preprocessing needs to be conducted to activate the ceramics and other powder that do not have surface catalytic activity. Meanwhile, the plating solution needs to have a certain stability to avoid spontaneous decomposition so as to uniformly disperse the powder in the plating solution. Therefore, the application range thereof is limited by a certain extent.

The chemical vapor deposition method is to form a solid sediment through an aggregation reaction of raw gases on a particle surface, so as to implement a coating effect to the powder particle. A carbon layer was coated on a $LiFePO_4$ powder surface with a particle size of 200 nm by Jiang Yong, et al, using the chemical vapor deposition method (Silicate Journal, 2008, 36, pp 1295-1299). Ni nanoparticles were coated on an aluminium oxide surface through pyrolysis by Zhang, et al, using the chemical vapor deposition method, and using a metal organic substance as a material, and heating the material to volatilize firstly, and then bringing the material into a high temperature reaction chamber through Ar. However, the nanoparticles are easy to conglobate and grow under a higher coating temperature, so as to reduce hardness and intensity of the powder after sintering (Journal of the European Ceramic Society, 2014, 34, pp 435-441).

BRIEF DESCRIPTION

An object of the present invention is to provide a method for coating metal nanoparticles on an oxide ceramic powder surface, which implements uniform coating of metal nanoparticles in a heating process of a reaction chamber through mixing a metal organic material and coating powder in advance, so that the coating temperature is reduced and the uniformity of dispersion is increased.

In order to achieve the technical object above, the following technical solutions are used in the present invention: a method for coating metal nanoparticles on an oxide ceramic surface includes the following steps of:

(1) blending oxide ceramic powder and a metal organic material according to a weight ratio of (1:1)-(10:1), obtaining blended powders through grinding and mixing the materials for 1-3 h, putting the grinded and blended powder into a rotational reactor, and starting up the rotational reactor to make the rotational reactor rotate;

(2) bubbling mixed gas of oxygen and argon into the rotational reactor, keeping the temperature for 0.5-2 h after warning up to 400-500° C. at a rate of 5-10° C./min to oxidize the metal organic material into a metal oxide, and then closing a gas inlet valve for oxygen and argon; and (3) bubbling reducing gas into the rotational reactor to reduce the metal oxide in step (2) into nanoparticles in a metallic state, cooling at a rate of 5-10° C./min, closing a gas inlet valve for reducing gas after cooling the temperature to room temperature, stopping the rotation of the rotational reactor, opening the reactor, taking the powder out, sieving and collecting the powder. Wherein, the oxide ceramic powder is any one of $Al_2O_3$, $ZrO_2$, $SiO_2$, MgO and $TiO_2$ with a particle size ranging from 100 nm to 100 μm, and a purity greater than 95%.

The metal organic material is a stable organometallic compound formed by bonding an alkyl group or an alkyl of an aryl with a metal atom, and a type thereof is selected according to a type of a metal nanoparticle that needs to be coated. For example, when Ni nanoparticles need to be coated on the oxide ceramic power surface, the metal organic material is any one of nickelocene ($NiCp_2$), tetracarbonyl nickel ($Ni(CO)_4$) and nickel acetate ($Ni(CH_3COO)_2 \cdot 4H_2O$).

When copper nanoparticles need to be coated on the oxide ceramic power surface, the metal organic material selected may be $Cu(DPM)_2$.

When cobalt nanoparticles need to be coated on the oxide ceramic power surface, the metal organic material selected is cobaltocene or hydroxyl cobalt.

When iron nanoparticles need to be coated on the oxide ceramic power surface, the metal organic material selected is ferrocene.

To be specific, a total pressure of the mixed gas of oxygen and argon bubbled in step (2) ranges from 200 to 1000 Pa, wherein a partial pressure of the oxygen ranges from 50 to 200 Pa, a temperature rising rate is 2-10° C./min, and a rotation rate of the rotational reactor ranges from 15 to 60 r/min.

In step (3), the reducing gas is any one of hydrogen, carbonic oxide and methane, and a partial pressure of the reducing gas ranges from 100 to 400 Pa.

Preferably, the powder in step (3) needs to be sieved for three times through a 50-200 mesh sieve.

Beneficial effects: the present invention provides a new method capable of coating uniformly distributed metal nanoparticles on different oxide ceramic powder surfaces. A metal nanoparticle layer is coated on the different oxide ceramic powder surfaces through controlling a process condition and selecting proper metal organic material, so as to adjust the surface appearance, electrical conductivity, or the like, of the powder surfaces, greatly improve the utilization degree of materials and the dependability of products, have the advantages of short preparation period, low energy consumption, environment friendly property, and obviously reduced production cost, so as to have a good industrial foreground. The coating uniformity of the metal nanoparticles is improved through premixing the oxide ceramic powder with the metal organic material; moreover, oxygenolysis of the metal nanoparticles is conducted while heating, which reduces the reaction time under a high temperature, and avoids the coarsening and growing of the metal nanoparticles.

DETAILED DESCRIPTION

The followings are preferred embodiments of the invention, which are illustrative of the invention and are not construed as limiting the invention, and all improvements made according to the description fall within the protection scope as defined in the appended claims of the invention.

Embodiment 1 Coat Ni Nanoparticles on Al2O3 Powder Surface

Figure 1:
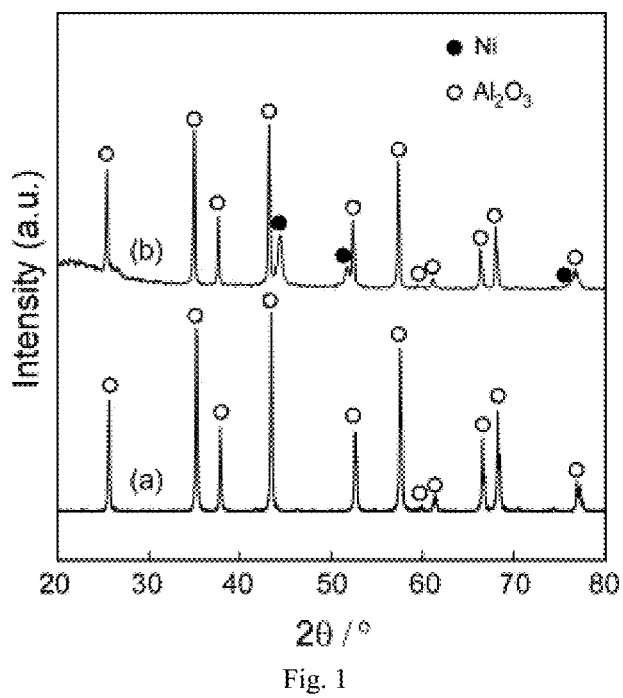
FIG. 1 is an X-ray diffraction diagram of $Al_2O_3$ powder coated with Ni nanoparticles in an embodiment 1: (a) before coating, and (b) after coating.
Figure 2:
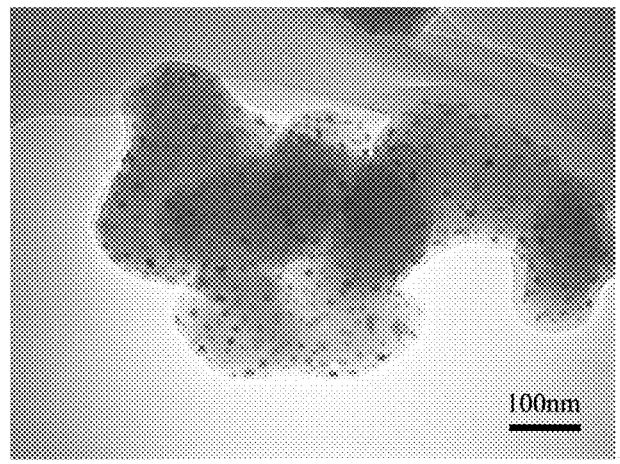
FIG. 2 is a transmission electron microscope photo of the $Al_2O_3$ powder coated with Ni nanoparticles in the embodiment 1.

Firstly, 5 g ordinary commercial $Al_2O_3$ powder (the particle size was 500 nm) and 0.5 g $Ni(CO)_4$ were mixed firstly, put into a rotational reactor, and then the reactor was rotated at a rotational rate of 45 r/min. Mixed gas of oxygen and Ar was bubbled, wherein a total pressure of the mixed gas was 1000 Pa and a partial pressure of the oxygen was 100 Pa. The temperature was kept for 45 min after warming up to 450° C. at a heating rate of 8° C./min, so that $Ni(CO)_4$ was oxidized into nickel oxide, then an oxygen supply valve was closed, and carbonic oxide was bubbled to reduce the metal oxide (nickel oxide) into nanoparticles in a metallic state. A partial pressure of the carbonic oxide was 200 Pa, the reduction reaction time was 45 min, and then the temperature was cooled at a cooling rate of 8° C./min. The gas valve was closed after the temperature was cooled to a room temperature, the rotation and heating of the reactor were stopped, then the reactor was opened, the powder was taken out, sieved for three times by a 100 mesh sieve, and then collected. The collected powder was characterized, wherein the results were as shown in FIG. 1 and FIG. 2. Wherein, FIG. 1 was an X-ray diffraction diagram of $Al_2O_3$ powder coated with Ni nanoparticles in the embodiment 1. Wherein a illustrated a condition before coating, and b illustrated a condition after coating, which proved that the $Al_2O_3$ powder was successfully coated with Ni nanoparticles. FIG. 2 was a transmission electron microscope photo of the $Al_2O_3$ powder coated with Ni nanoparticles, and it may be seen from the figure that the Ni nanoparticles were uniformly coated on the $Al_2O_3$ powder surface.

Embodiment 2 Coat Cu Nanoparticles on $Al_2O_3$ Powder Surface

Firstly, 5 g ordinary commercial $Al_2O_3$ powder (the particle size was 100 nm) and 2 g $Cu(DPM)_2$ (copper dipivaloylmethanate) were mixed firstly, put into a rotational reactor, a feeding valve of the rotational reactor was closed, and the rotational reactor was started up to rotate at a rotational rate of 60 r/min. Next, mixed gas of oxygen and argon gas was bubbled, wherein a total pressure of the mixed gas was 800 Pa and a partial pressure of the oxygen was 50 Pa. A heating rate was set as 5° C./min, the temperature was kept for 60 min after warming up to 400° C., so that $Cu(DPM)_2$ was oxidized into cupric oxide, then an oxygen supply valve was closed, and methane was bubbled to reduce a metal oxide CuO into nanoparticles in the metallic state. A partial pressure of the methane was 100 Pa, the reduction reaction time was 60 min, and then the temperature was cooled at a cooling rate of 5° C./min. A carbonic oxide inlet valve and an argon gas inlet valve were closed after the temperature was cooled to a room temperature, the rotation and heating of the reactor were stopped, then the reactor was opened, the powder was taken out, sieved for three times by a 200 mesh sieve, and then collected.

Embodiment 3 Coat Ni Nanoparticles on $ZrO_2$ Powder Surface

Figure 3:
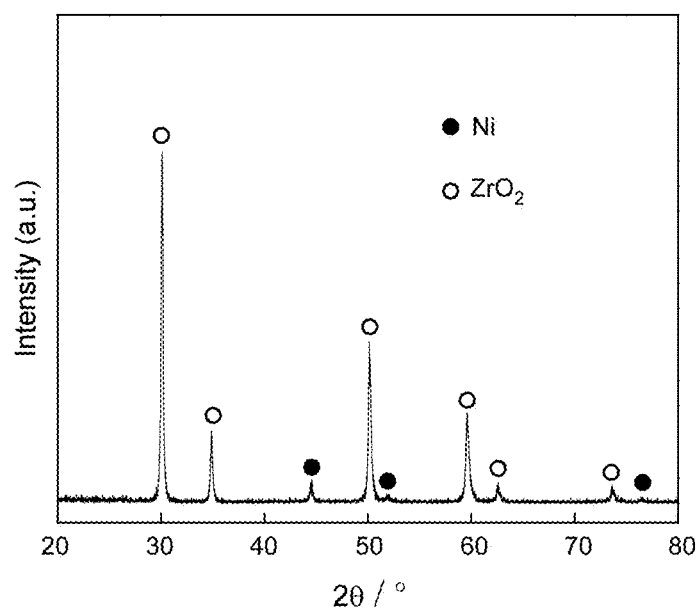
FIG. 3 is an X-ray diffraction diagram of $ZrO_2$ powder after being coated with Ni nanoparticles in a embodiment 3.
Figure 4:
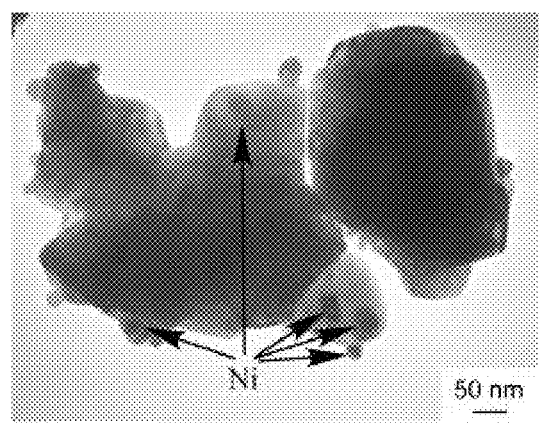
FIG. 4 is a transmission electron microscope photo of the $ZrO_2$ powder coated with Ni nanoparticles in the embodiment 3.

Firstly, 5 g ordinary commercial $ZrO_2$ powder (the particle size was 10 μm) and 5 g $NiCp_2$ (nickelocene) were blended, put into a rotational reactor, and then the reactor was rotated at a rotational rate of 15 r/min. Mixed gas of oxygen and Ar was bubbled, wherein a total pressure of the mixed gas was 800 Pa and a partial pressure of the oxygen was 200 Pa. The temperature was kept for 30 min after warming up to 450° C. at a heating rate of 7° C./min, so that $NiCp_2$ was oxidized into NiO, then an oxygen supply valve was closed, and hydrogen was bubbled to reduce a metal oxide NiO into nanoparticles in a metallic state. A partial pressure of the hydrogen was 400 Pa, the reduction reaction time was 30 min, and the temperature was cooled at a cooling rate of 7° C./min. The gas valve was closed after the temperature was cooled to a room temperature, the rotation and heating of the reactor were stopped, then the reactor was opened, the powder was taken out, sieved for three times by a 100 mesh sieve, and then collected. The collected powder was characterized, wherein the results were as shown in FIG. 3 and FIG. 4. Wherein, FIG. 3 was an X-ray diffraction diagram of $ZrO_2$ powder coated with Ni nanoparticles, which proved that the $ZrO_2$ powder was successfully coated with the Ni nanoparticles. FIG. 4 was a transmission electron microscope photo of $ZrO_2$ powder coated with Ni nanoparticles, and it may be seen from the figure that the Ni nanoparticles were uniformly coated on the $ZrO_2$ powder surface.

Embodiment 4 Coat Co Nanoparticles on $TiO_2$ Powder Surface

Taking a $TiO_2$ powder surface coated with Co nanoparticles for example, 5 g ordinary commercial $TiO_2$ powder (the particle size was 50 μm) and 2 g $CoCp_2$ (Cobaltocene) were mixed firstly, put into a rotational reactor, and then the reactor was rotated at a rotational rate of 60 r/min. Mixed gas of oxygen and Ar was bubbled, wherein a total pressure of the mixed gas was 200 Pa and a partial pressure of the oxygen was 50 Pa. The temperature was kept for 15 min after warming up to 400° C. at a heating rate of 10° C./min, so that $CoCp_2$ was oxidized into cobaltous oxide, then an oxygen supply valve was closed, and methane was bubbled to reduce a metal oxide (cobaltous oxide) into nanoparticles in a metallic state. A partial pressure of the methane was 100 Pa, the reduction reaction time was 15 min, and then the temperature was cooled at a cooling rate of 10° C./min. The gas valve was closed after the temperature was cooled to a room temperature, the rotation and heating of the reactor were stopped, then the reactor was opened, the powder was taken out, sieved for three times by a 50 mesh sieve, and then collected.

Embodiment 5 the Surface of $SiO_2$ Powder Coated with Fe Nanoparticles

Taking a $SiO_2$ powder surface coated with Fe nanoparticles for example, 5 g ordinary commercial $SiO_2$ powder (the particle size was 100 μm) and 2 g $FeCp_2$ (ferrocene) were mixed firstly, put into a rotational reactor, and then the reactor was rotated at a rotational rate of 60 r/min. Mixed gas of oxygen and Ar was bubbled, wherein a total pressure of the mixed gas was 800 Pa and a partial pressure of the oxygen was 10 Pa. The temperature was kept for 30 min after warming up to 500° C. at a heating rate of 8° C./min, so that $FeCp_2$ as oxidized into iron oxide, then an oxygen supply valve was closed, and carbonic oxide was bubbled to reduce iron oxide into nanoparticles in a metallic state. A partial pressure of the carbonic oxide was 200 Pa, the reduction reaction time was 30 min, and then the temperature was cooled at a cooling rate of 8° C./min. The gas valve was closed after the temperature was cooled to a room temperature, the rotation and heating of the reactor were stopped, then the reactor was opened, the powder was taken out, sieved for three times by a 50 mesh sieve, and then collected.

Embodiment 6 Coat Co Nanoparticles on MgO Powder Surface

Taking a MgO powder surface coated with Co nanoparticles for example, 6 g ordinary commercial MgO powder (the particle size was 50 μm) and 2 g $CoCp_2$ (Cobaltocene) were mixed firstly, put into a rotational reactor, and then the reactor was rotated at a rotational rate of 60 r/min. Mixed gas of oxygen and Ar was bubbled, wherein a total pressure of the mixed gas was 600 Pa and a partial pressure of the oxygen was 150 Pa. The temperature was kept for 20 min after warming up to 400° C. at a heating rate of 6° C./min, so that $CoCp_2$ was oxidized into cobaltous oxide, then an oxygen supply valve was closed, and methane was bubbled to reduce a metal oxide $Co_2O_3$ into nanoparticles in a metallic state. A partial pressure of the methane was 100 Pa, the reduction reaction time was 15 min, and then the temperature was cooled at a cooling rate of 10° C./min. The gas valve was closed after the temperature was cooled to a room temperature, the rotation and heating of the reactor were stopped, then the reactor was opened, the powder was taken out, sieved for three times by a 50 mesh sieve, and then collected.

Embodiment 7 Coat Ni Nanoparticles on $SiO_2$ Powder Surface

Taking a $SiO_2$ powder surface coated with Ni nanoparticles for example, 5 g ordinary commercial $SiO_2$ powder (the particle size was 100 μm) and 3 g Ni $(CH_3COO)_2.4H_2O$ were mixed firstly, put into a rotational reactor, and then the reactor was rotated at a rotational rate of 50 r/min. Mixed gas of oxygen and Ar was bubbled, wherein a total pressure of the mixed gas was 800 Pa and a partial pressure of the oxygen was 15 Pa. The temperature was kept for 30 min after warming up to 500° C. at a heating rate of 8° C./min, so that Ni $(CH_3COO)_2.4H_2O$ was oxidized into nickel oxide, then an oxygen supply valve was closed, and carbonic oxide was bubbled to reduce the nickel oxide into nanoparticles in a metallic state. A partial pressure of the carbonic oxide was 200 Pa, the reduction reaction time was 30 min, and then the temperature was cooled at a cooling rate of 8° C./min. The gas valve was closed after the temperature was cooled to a room temperature, the rotation and heating of the reactor were stopped, then the reactor was opened, the powder was taken out, sieved for three times by a 50 mesh sieve, and then collected.

The invention claimed is:
1. A method for coating metal nanoparticles on an oxide ceramic surface, comprising the following steps of:
(1) blending oxide ceramic powder and a metal organic material according to a weight ratio of (1:1)-(10:1), obtaining blended powders through grinding and mixing the materials for 1-3 h, putting the grinded and blended powder into a rotational reactor, and starting up the rotational reactor to make the rotational reactor rotate, wherein the metal organic material is a stable organometallic compound formed by bonding an alkyl group or an alkyl of an aryl with a metal atom;

(2) bubbling mixed gas of oxygen and argon into the rotational reactor, keeping the temperature for 0.5-2 h after warming up to 400-500° C. at a rate of 5-10° C./min to oxidize the metal organic material into a metal oxide, and then closing a gas inlet valve for oxygen and argon; and (3) bubbling reducing gas into the rotational reactor to reduce the metal oxide in step (2) into nanoparticles in a metallic state, cooling at a rate of 5-10° C./min, closing a gas inlet valve for reducing gas after cooling the temperature to room temperature, stopping the rotation of the rotational reactor, opening the reactor, taking the powder out, sieving and collecting the powder.

2. The method according to claim 1, wherein the oxide ceramic powder is any one of $Al_2O_3$, $ZrO_2$, $SiO_2$, MgO and $TiO_2$, with a particle size ranging from 100 nm to 100 μm, and a purity greater than 95%.

3. The method according to claim 1, wherein the metal organic material is any one of nickelocene, tetracarbonyl nickel and nickel acetate.

4. The method according to claim 1, wherein the metal organic material is copper dipivaloylmethanate.

5. The method according to claim 1, wherein the metal organic material is cobaltocene or hydroxyl cobalt.

6. The method according to claim 1, wherein the metal organic material is ferrocene.

7. The method according to claim 1, wherein a total pressure of the mixed gas of oxygen and argon bubbled in step (2) ranges from 200 to 1000 Pa, a partial pressure of the oxygen ranges from 50 to 200 Pa, and a rotation rate of the rotational reactor ranges from 15 to 60 r/min.

8. The method according to claim 1, wherein the reducing gas in step (3) is any one of hydrogen, carbonic oxide and methane, and a partial pressure of the reducing gas ranges from 100 to 400 Pa.

9. The method according to claim 1, wherein the powder in step (3) is sieved for three times through a 50-200 mesh sieve.

* * * * *